Sept. 10, 1957 C. F. EDWARDS 2,806,210

IMPEDANCE MATCHING DEVICES FOR WAVE-GUIDE HYBRID JUNCTIONS

Filed July 20, 1953 2 Sheets-Sheet 1

INVENTOR
C. F. EDWARDS
BY H. O. Wright
ATTORNEY

Sept. 10, 1957 C. F. EDWARDS 2,806,210

IMPEDANCE MATCHING DEVICES FOR WAVE-GUIDE HYBRID JUNCTIONS

Filed July 20, 1953 2 Sheets-Sheet 2

INVENTOR
C. F. EDWARDS
BY H. O. Wright
ATTORNEY

United States Patent Office 2,806,210

Patented Sept. 10, 1957

2,806,210

IMPEDANCE MATCHING DEVICES FOR WAVE-GUIDE HYBRID JUNCTIONS

Charles F. Edwards, Red Bank, N. J., assignor to Bell Telephone Laboratories, Incorporated, New York, N. Y., a corporation of New York Application July 20, 1953, Serial No. 368,911

2 Claims. (Cl. 333—11)

This invention relates to improvements in impedance matching and/or compensating devices for wave-guide hybrid junctions of the so-called "magic T" type. More particularly, it relates to devices of the above character of simple construction which can be readily inserted and accurately assembled in a "magic T" type wave-guide hybrid junction without the necessity of performing any precise machine operation on the wave-guide junction.

As is well known to those skilled in the art, a wave-guide "magic T" hybrid junction comprises a junction between four arms of hollow, single-conductor, wave guide of like, non-square, rectangular cross-section, a pair of arms of the junction being collinear, like, extensions of each other and being commonly known as the "side arms" of the junction. The third and fourth arms are orthogonally related to each other and to said pair of side arms. The third and fourth arms have their longitudinal axes in a common plane and are turned a quarter turn (90 degrees) about said axes with respect to each other. The third one of said arms joins perpendicularly to a broader side of the first-mentioned pair of side arms, with the narrower sides of said third arm in the same planes, respectively, as the narrower sides of said first-mentioned pair of side arms. This arm is commonly known as the "E-plane arm" or more simply, as the "E-arm" of the junction. Similarly, the fourth arm joins perpendicularly to a narrower side of the said pair of side arms, with the broader sides of said fourth arm in the same planes, respectively, as the broader sides of said first-mentioned pair. This arm is commonly known as the "H-plane arm" or more simply, as the "H arm" of the junction. A rectangular portion of the side of said first-mentioned pair of arms is removed at each of said above-described junctions with the H and E arms, corresponding exactly with the internal openings of the joining third and fourth arms, respectively. A typical "magic T" or four-arm wave-guide hybrid junction (including prior art impedance matching or compensating devices) is shown, for example, in Fig. 9.5–5 on page 341 of the book entitled "Principles and Applications of Waveguide Transmission," by Dr. G. C. Southworth, published by D. Van Nostrand Company, New York, New York, 1950.

As is explained in detail in the last full paragraph on page 340 of Dr. Southworth's above-mentioned book, there is a necessity for employing impedance matching or compensating devices in or near the throat or central portion of the wave-guide hybrid junction of the so-called "magic T" type. Prior art arrangements suggested to afford the desired impedance matching or compensation are in general well represented by the horizontal and vertical rods shown in the previously mentioned Fig. 9.5–5 on page 341 of Dr. Southworth's book, the horizontal rod providing an inductive compensating impedance near the inner or lower end of arm A and the vertical rod providing a capacitative compensating impedance in the throat of the junction which, as explained, effects a matching or compensating of the impedance of arm C with respect to the side arms B and D. In general, impedance matching or compensation of the wave-guide hybrid junction of the so-called "magic T" type can be effected by numerous and varied arrangements, the fundamental underlying rules being that (1) either inductive or capacitative impedances, suitably proportioned, can be inserted in both the A and the C arms (E and H arms per Fig. 1 of the present application), both being inductive, or both being capacitative, or either being inductive and the other capacitative, the impedances in any case being situated in their associated arms near the end joining the throat or central portion of the junction; or (2) alternatively, either the A or the C arm (E or H per Fig. 1 of present application) can include either an inductive or a capacitative matching or compensating impedance and both of the side arms B and D (Southworth's Fig. 9.5–5, supra, and Fig. 1 of the present application) can include either an inductive or a capacitative matching or compensating impedance, the type of compensating impedance being the same for the two side arms B and D. In some arrangements, as in the structure of Southworth's Fig. 9.5–5, supra, for example, a single symmetrically positioned element (the vertical post) can provide the impedance compensation for both side arms B and D.

While the arrangement of Southworth's Fig. 9.5–5, supra, and a number of related arrangements of the prior art, provide generally satisfactory impedance matching or compensation, they are all relatively expensive and difficult to manufacture since they require precise machine operations on the hybrid junction in order to accurately position the horizontal and vertical compensating rods as required for proper operation. To avoid this objection, applicant has devised a number of unitary compensating devices which can be readily assembled in correct position in the hybrid junction and easily secured in that position by a simple operation, such as soldering, which involves no precision machining of the junction.

A principal object of the invention is, therefore, to simplify the problems attending the impedance matching or compensating of wave-guide hybrid junctions of the "magic T" type.

A further object is to simplify impedance matching or compensating devices for wave-guide hybrid junctions and their assembly and mounting within the junction.

In accordance with another object of the invention, simple unitary impedance matching or compensating devices for "magic T" type wave-guide hybrid junctions which can be easily and accurately assembled and secured in the proper position in the junction without the necessity of performing precise machine operations on the junction, are disclosed.

Still another object is to devise simple, economical, accurate and effective methods for effecting impedance matching or compensation of wave-guide hybrid junctions of the "magic T" type.

Other and further objects and features of the invention will become apparent during the course of the following detailed description of specific illustrative embodiments of the principles of the invention given below and from the appended claims.

The features and principles of the invention will be more readily understood from the following detailed description of a number of specific illustrative embodiments of devices of the invention and the installation of said devices in a specific "magic T" wave-guide hybrid junction, as illustrated by the accompanying drawings, in which.

Figure 1:
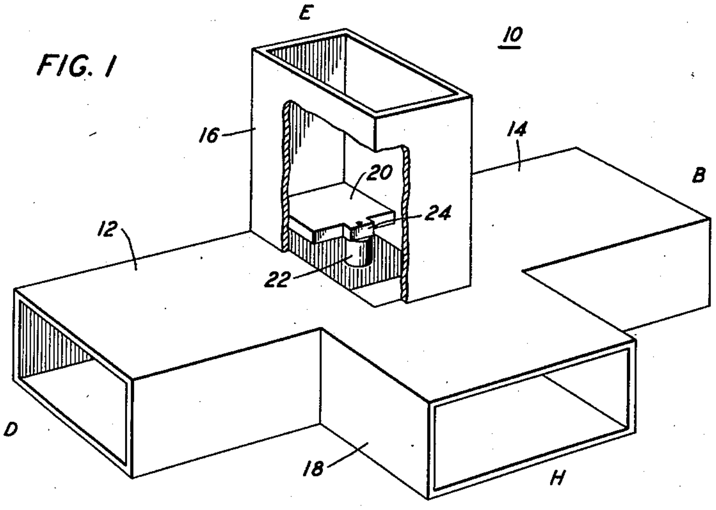
Fig. 1 shows in perspective view a "magic T" wave-guide hybrid junction in which one species of impedance matching device of the invention has been installed.
Figures 9, 10, 11, 12:
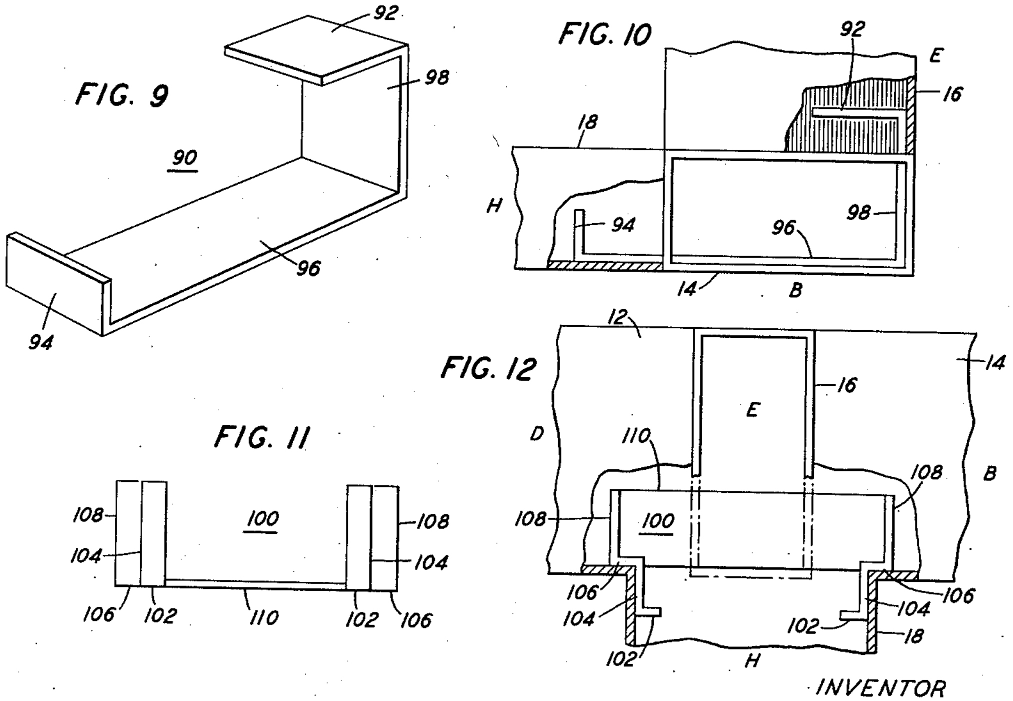
Fig. 9 shows a fourth specific embodiment of a unitary impedance matching device of the invention.
Fig. 10 is a side view of the wave-guide hybrid or "magic T" junction of Fig. 1 illustrating the installation of the device of Fig. 9 therein.
Fig. 11 shows a fifth specific embodiment of a unitary impedance matching device of the invention.
Fig. 12 is a top view of the wave-guide hybrid or "magic T" junction of Fig. 1 illustrating the installation of the device of Fig. 11 therein.

In more detail, in Fig. 1 assembly 10 is a "magic T" or wave-guide hybrid junction of the general type illustrated in Fig. 9.5–5 on page 341 of Dr. Southworth's abovementioned book except for the omission of the impedance matching rods shown in the Southworth figure.

In Fig. 1 the two collinear or side arms D and B of the junction are designated 12 and 14, respectively. The vertical arm E is designated 16 and, as is well known to those skilled in the art, effects an electrical series connection with the side arms 12 and 14. The horizontal arm H is designated 18 and, as is well known to those skilled in the art, effects an electrically parallel connection with the side arms 12 and 14.

An illustrative species of an impedance matching or compensating device of the invention comprises a plate 20 to which is affixed a post 22 which device is assembled in the vertical arm 16 as shown in Fig. 1.

Figure 2:
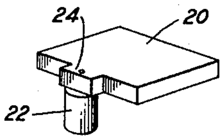
Fig. 2 shows in perspective view the specific embodiment of a unitary impedance matching device of the invention which is shown in Fig. 1, installed in a wave-guide junction.

The details of this species of impedance matching device may be more clearly seen, as shown to an enlarged scale, in Fig. 2. The specific device illustrated in Fig. 2 (as well as other species of the invention described in detail hereinunder) is designed for use in a wave-guide hybrid or "magic T" junction, the four rectangular wave-guide sections or arms of which all have internal cross-sectional dimensions of .400 and .900 inch, respectively.

One dimension of plate 20 is then made .400 inch and the other neglecting the small extension 24, is .338 inch, the main portion of plate 20 being substantially rectangular in shape. It should be made of highly conductive material such as copper, brass, or the like, and can, for example, conveniently be of sheet material .062 inch thick. A small extension designated 24, centrally located on one of the longer edges of plate 20, as shown, provides for mounting a circularly cylindrical post 22 of highly conductive material, which may be, for example, of the same material as is used for plate 20. Post 22 is securely fastened to extension 24 and, for the specific example given above, its diameter may be .125 inch and its longitudinal axis may be at a distance of .354 inch from the opposite long edge of plate 20. As shown, post 22 is mounted with its longitudinal axis perpendicular to the plane of plate 20. For the specific example assumed above, when the device of Fig. 2 is inserted in the vertical arm 16 of the hybrid junction of Fig. 1, the lower surface of plate 20 should be at a distance of .110 inch from the inner surface of the upper side of the lateral arms 12 and 14. The length of post 22 from the lower surface of plate 20 to the free end of the post should, for the above assumed specific example, be .141 inch so that it extends into the throat of the junction, i. e., the portion between the collinear arms 12 and 14, by substantially .031 inch. The specific design described will operate satisfactorily throughout a frequency range of 1000 megacycles centered about a frequency of 11.2 kilomegacycles. As is well known to those skilled in the art, the dimensions and proportions of the wave-guide structures and of the compensating elements are determined by the frequency range throughout which the device is to be used. Empirical methods, based upon experience, enable those skilled in the art to determine the approximate dimensions and proportions and the final dimensions for any specific design are determined by experimental "cut and try" methods.

Figure 3:
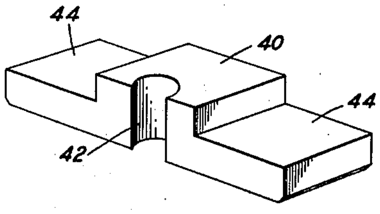
Fig. 3 shows an assembly jig employed in assembling the device of Fig. 2 in the wave-guide hybrid or "magic T" junction.

To facilitate the assembly of the structure of Fig. 2 in the hybrid junction of Fig. 1, a jig 40 as shown in Fig. 3, to an enlarged scale, may be employed. Again assuming that the wave-guide junction is composed of wave-guide sections having internal cross-sectional dimensions of .400 by .900 inch, the upper portion of the jig 40 should have a long dimension of .400 inch and a width dimension of .375 inch with a cylindrical recess 42 centrally located on one of the longer sides to clear post 22 of the device of Fig. 2 when both the device and the jig are assembled in arm 16 as described hereinbelow. The central portion of jig 40 is raised by .110 inch from the upper surface of its base portion 44. The base portion 44 can have a vertical dimension or thickness of .140 inch so that the total vertical height of jig 40 is substantially one-quarter inch.

Figure 4:
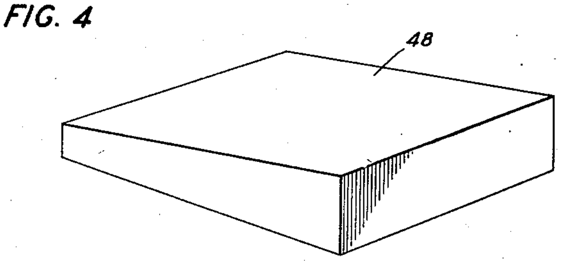
Fig. 4 shows a wedge employed to hold the jig of Fig. 3 in place during the process of assembly of the device of Fig. 2.

The jig 40 of Fig. 3 can, then, be inserted through either of the arms 12 or 14 until its raised central portion registers with the lower end of the vertical arm 16, whereupon wedges of the type designated 48 in Fig. 4 may be inserted in arms 12 and 14 and forced under the ends of jig 40 so as to raise it sufficiently to bring the upper surface of base portion 44 firmly in contact with the upper inside surfaces of the arms 12 and 14. The ends of the base portion 44 are preferably beveled slightly to facilitate the insertion of the wedges beneath them.

If necessary, a probe or rod can be inserted through horizontal arm 18 to push the jig 40 firmly against the inner rear surfaces of arms 12, 14 and 16.

The device of Fig. 2 may then be inserted through arm 16, with post 22 extending toward the throat or central portion of the hybrid junction, until the lower surface of plate 20 is resting squarely upon the upper surface of the central raised portion of jig 40, whereupon the two ends and back edge of plate 20 may be soldered to the arm 16.

The presence of the tightly fitting jig beneath the plate 20 serves the additional purpose of preventing excess solder from flowing down and forming fillets in inaccessible portions of the wave-guide junction.

When the solder has cooled, the wedges 48 may be removed permitting the jig 40 to drop onto the bottom surface of arms 12 and 14, whereupon it can be extracted through either of the arms 12 or 14.

Jig 40 of Fig. 3 should preferably be made of a metal to which solder does not readily adhere, such as aluminum or iron or the like, whereas the wave-guide junction and plate 20 should obviously be of materials, such as copper or brass, to which solder will readily adhere. The fit between the upper portion of jig 40 and the inside of arm 16 should be a "close sliding fit." The fit between plate 20 and the inside of arm 16 should also preferably be a "close sliding fit."

Figure 5:
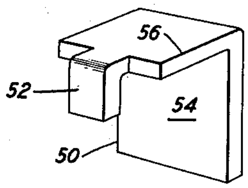
Fig. 5 shows a second specific embodiment of a unitary impedance matching device of the invention.

In Fig. 5, the device 54 represents an alternative species of unitary impedance matching or compensating device of the invention suitable for use in hybrid junctions of the type illustrated in Fig. 1. It comprises a strip 50, 56 of sheet metal (preferably copper or brass) which can be, for example, .062 inch thick, and for the junction shown in Fig. 1 and the frequency range for which the device of Fig. 2 was designed, should be substantially .400 inch wide and .881 inch long with a .125 inch wide tongue portion 52, having a length of .157 inch extending from the center of the upper edge of the strip, as shown. The upper end of the strip is bent at right angles to form a horizontal plate portion 56, substantially .338 inch by .400 inch, and the tongue portion 52 is bent downward at right angles from said plate portion 56 and at a distance of .354 inch from the opposite longer edge of said plate portion to provide a downwardly extending tongue portion substantially .141 inch long, the completed device having the shape shown in Fig. 5.

Figure 6:
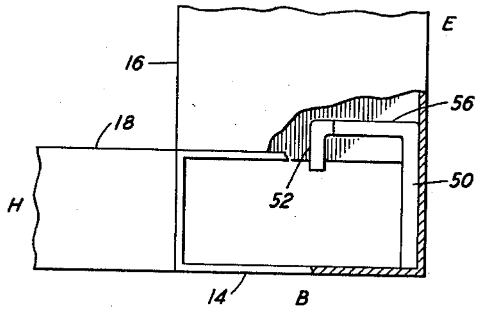
Fig. 6 is a side view of the wave-guide hybrid or "magic T" junction of Fig. 1 illustrating the installation of the device of Fig. 5 therein.

In Fig. 6 a side view of the throat or junction portion of the hybrid junction of Fig. 1 is shown with the device 54 of Fig. 5 assembled therein. As shown, the vertical portion 50 is assembled adjacent the rear or right wall of vertical arm 16 and rests on the lower wall of arm 14 opposite the opening into horizontal arm 18. The length of portion 50 of device 54 is, of course, chosen to properly position the horizontal portion 56 of device 54 in the vertical arm 16 and the length of the tongue portion 52 is chosen so that its lower end will protrude into the throat or junction portion of the hybrid junction in substantially the same manner as described in detail above for post 22 of the device of Fig. 2. Portion 50 is then fastened to arm 16 by soldering or other suitable means as suggested for the device of Fig. 2. The device of Fig. 5 can, obviously, be assembled directly in the wave guide without the necessity of using a jig. It can also, obviously, be made quickly and cheaply by simple processes readily adapted to mass production. Under substantially all practical circumstances, the presence of the lower part of portion 50 of device 54 within the throat or junction portion of the hybrid junction will result in no objectionable disturbance of the wave energy. Except in rare instances, therefore, the device of Fig. 5 will be preferable to that of Fig. 2.

Figure 7:
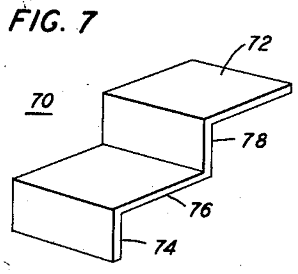
Fig. 7 shows a third specific embodiment of a unitary impedance matching device of the invention.

In Fig. 7, the device 70 represents a somewhat different approach to the problem of providing a simple unitary impedance matching or compensating device for the hybrid junction of Fig. 1 which can be readily assembled in the throat, or junction portion, of the junction. The device of Fig. 7 comprises, as shown, a strip of sheet metal (preferably of copper or brass) which can, for example, for the junction shown in Fig. 1 and the frequency range for which the device of Fig. 2 was designed, be .062 inch thick and .400 inch wide and have two vertical portions 74 and 78 and two horizontal portions 76 and 72. Appropriate longitudinal dimensions for these portions, for use as indicated above, are, substantially, .203, .199, .376 and .371 inch, respectively.

Figure 8:
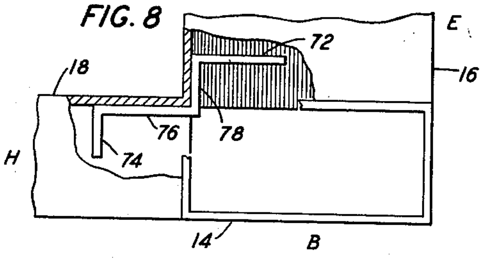
Fig. 8 is a side view of the wave-guide hybrid or "magic T" junction of Fig. 1 illustrating the installation of the device of Fig. 7 therein.

Fig. 8 is a side view of the hybrid junction of Fig. 1 with portions cut away to show the device of Fig. 7 assembled in the throat and arms of the junction. As shown, portion 72 of the device of Fig. 7 constitutes an impedance correcting element for the vertical arm 16 of the hybrid junction and portion 74 constitutes an impedance correcting element for the horizontal arm 18 of the junction, the portions 76 and 78 serving to position portions 74 and 72 appropriately in their respective arms. Portions 76 and 78 are secured, by soldering or other suitable means, in position as illustrated in Fig. 8.

In Fig. 9 a further alternative species of unitary form of device for positioning and supporting impedance correcting or compensating elements in the vertical and horizontal arms of a wave-guide hybrid (or magic T) junction is shown. It comprises horizontal portions 92 and 96 and vertical portions 94 and 98. Portions 94 and 92 can be identical to the portions 74 and 72 of Fig. 7, respectively, and constitute the impedance correcting elements for the horizontal and vertical arms 18 and 16, respectively, of the hybrid junction. Portions 96 and 98 function to position and support portions 94 and 92.

In Fig. 10 a side view of the hybrid junction of Fig. 1 with portions cut away to show the device of Fig. 9 assembled in the throat and arms of the junction, is shown. Portions 96 and 98 are secured by soldering or other suitable means in position as illustrated in Fig. 10.

In Fig. 11, a still further alternative species 100 of the invention is shown and comprises in essence two devices similar in general shape to the device of Fig. 7 fastened together by a flat bar or yoke 110. The device of Fig. 11 is shown assembled in the wave-guide hybrid junction of Fig. 1 in Fig. 12. Fig. 12 is a top view of the junction of Fig. 1. The right and left portions of the device 100 are symmetrical with respect to a vertical center line through bar or yoke 110 as it appears in Fig. 12. On each end of the bar or yoke 110 is an impedance matching or compensating device, comprising, as shown in Fig. 12, two horizontal portions 102, 106, and two vertical portions 104, 108, the two being held in appropriate relative proximity by bar or yoke 110, as shown. The over-all device 100 can then be assembled in the wave-guide hybrid junction of Fig. 1, through either of the side arms 12 or 14 and positioned as shown in Fig. 12, after which it can be secured by soldering, or other suitable means.

As shown in Fig. 12 the two portions 102 of the pair of devices are positioned in arm 18 and the two portions 108 are positioned in the side arms 12 and 14, respectively, as shown.

In accordance with the generalized statement made near the beginning of this application, the devices of Figs. 2, 5 and 11 are of the type which include an impedance matching or compensating member in one of the arms E or H together with an impedance matching or compensating element, or elements, which effect both of the side arms B and D, whereas the devices of Figs. 7 and 9 are of the type in which impedance matching or compensating elements are placed in each of the E and H arms only. As a still further alternative, the device of Fig. 9 could be readily modified to be of the first-mentioned type by omitting the portion 94 and adding a vertical post supported on portion 96, the position and proportions of the post being substantially as shown for the vertical post of Fig. 9.5–5 on page 341 of Dr. Southworth's above-mentioned book. For this variation, portion 96 could obviously be reduced in length from its junction with portion 98 so that the unitary device could be readily inserted in the E arm 16 of Fig. 10.

As is well known to those skilled in the art, for the usual type of wave guide of rectangular cross-section in which one cross-sectional dimension is substantially twice the other, a bar or plate so placed as to decrease the broader dimension of the guide (such as member 20 of Figs. 1 and 2, 56 of Figs. 5 and 6, member 72 of Figs. 7 and 8, 92 of Figs. 9 and 10 or members 102 of Figs. 11 and 12) is essentially inductive. On the other hand, a centrally positioned obstruction extending into the wave guide from a broader side of the guide so as to decrease the narrower dimension of the guide (such as post 22 of Figs. 1 and 2, projection 52 of Figs. 5 and 6, member 74 of Figs. 7 and 8, member 94 of Figs. 9 and 10 or members 108 of Figs. 11 and 12) is essentially capacitative.

Numerous and varied other arrangements within the spirit and scope of the principles of the invention will readily occur to those skilled in the art. For example, the impedance corrective or compensating elements could be brazed, crimped, pinned or held by screws in their respective positions. Furthermore, to increase the ease of assembly, the "unitary" arrangements of the invention may in some instances comprise physically separable parts. For example, the device of Fig. 9 could, prior to assembly in the junction, equally well comprise two physically separable parts, one consisting of portions 94 and 96 and the other consisting of portions 92 and 98, the device becoming "unitary" upon assembly in the junction. Similarly, the device of Fig. 11 could, prior to assembly in the junction, comprise two physically separate members each consisting of portions 102, 104, 106 and 108, the bar 110 being omitted and the arrangement becoming "unitary" upon the assembly in the junction, as shown in Fig. 12, of the two physically separate members. Also, obviously, the shape, area and positioning of the various assemblies of corrective or compensating elements within the wave-guide junction, can be varied within wide limits to provide appropriate impedance correction or compensation for particular other specific wave-guide junction designs. The optimum proportions and position for the impedance matching or compensating devices of the invention for any specific wave-guide junction and operating frequency range are, as previously stated above, best determined experimentally. The specific designs described in detail above, by way of illustration, are believed to be satisfactory for the particular junction shown in Fig. 1 operating over a band of 1000 megacycles centered about the frequency 11.2 kilomegacycles, for the majority of practical uses. The species of Figs. 7, 9 and 11 will, in general, be more frequency sensitive than those of Figs. 2 and 5 so that that the latter are usually preferable where the hybrid junction is to be employed over a relatively very wide band of frequencies. In any event, the exact proportions of the impedance compensating elements will depend to a considerable extent upon the cross-sectional dimensions of the wave guide of which the hybrid junction is constructed and upon the frequency range in which it is to be used. As stated in Dr. Southworth's book, supra, page 341, "The approximate locations of these rods may be predicted from general experience with other similar devices, but their precise locations and their proportioning are usually arrived at empirically."

What is claimed is:

1. Impedance compensating means for a wave-guide hybrid junction comprising as a unitary structure a conductive plate member proportioned to close off a portion of the E arm of said junction and a conductive post member attached to and supported by said plate member and extending perpendicularly with respect to said plate member, whereby when said plate member is inserted transversely in said E arm at a predetermined distance from the inner end of said E arm said post will extend a predetermined distance beyond the inner end of said E arm into the throat of the hybrid junction and the combination of said plate member and said post member will compensate for impedance variations of said hybrid junction.

2. The impedance compensating means of claim 1, said means including a third member for positioning said conductive plate member in the E arm at said predetermined distance from the inner end of te E arm, said positioning member comprising a second plate member joined at right angles to an edge of said first plate member to be positioned against the narrow wall of said E arm more remote from the H arm of said wave-guide hybrid junction, said second plate member fitting snugly between the broader sides of said E arm and against the said narrow wall of said E arm of said junction and extending into the throat of said junction against the surface of said throat portion opposite to the H arm of said junction, the length of said second plate member being such that when its free end is against the wall of the throat portion of said junction opposite said E arm, said first plate portion is at said predetermined distance from the inner end of said E arm.

References Cited in the file of this patent

UNITED STATES PATENTS

| | | |
|---|---|---|
| 2,584,162 | Sensiper | Feb. 5, 1952 |
| 2,689,942 | Zaleski | Sept. 21, 1954 |